May 7, 1963     G. NIEUWEBOER     3,089,061
SIGNAL GENERATOR
Filed June 19, 1959     2 Sheets-Sheet 1
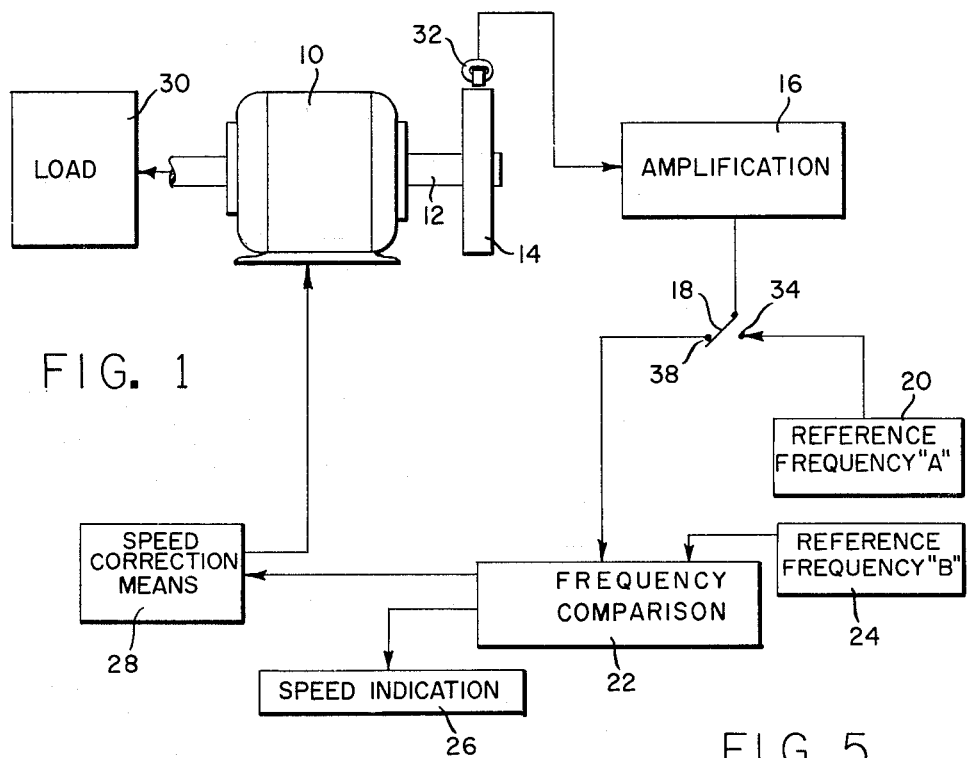
FIG. 1
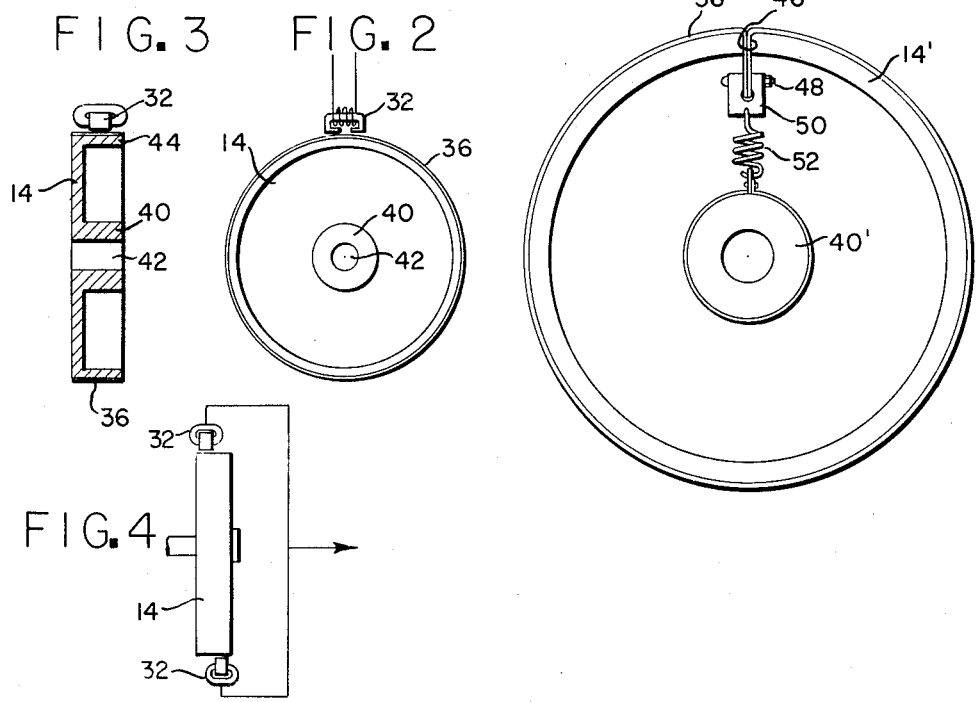
FIG. 3    FIG. 2      FIG. 5
FIG. 4

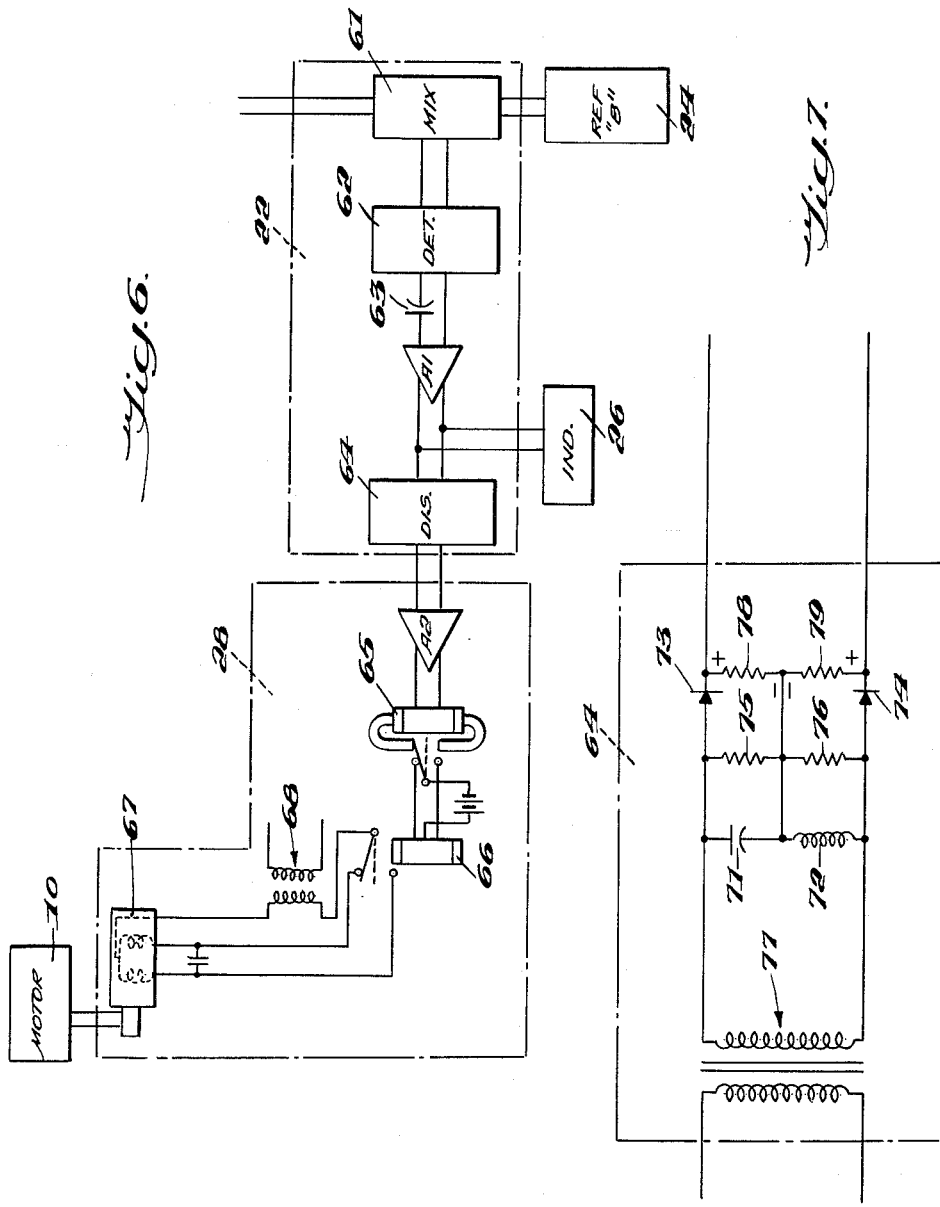

United States Patent Office 3,089,061
Patented May 7, 1963

3,089,061
SIGNAL GENERATOR
Gerrit Nieuweboer, Wilmington, Del., assignor to E. I. du Pont de Nemours and Company, Wilmington, Del., a corporation of Delaware
Filed June 19, 1959, Ser. No. 821,396
2 Claims. (Cl. 317—5)

This invention relates generally to a system for regulating the speed of a rotary device and, more particularly, to an alternating current tachometer generator which is adapted for use in a speed regulation system.

Alternating current tachometers or magnetos as commercially used are ordinarily totally enclosed ball-bearing inductor alternators equipped with permanent magnets. When coupled to rotary equipment, the frequency output of an alternating tachometer generator is proportional to the r.p.m. of the rotary equipment, according to the well-known expression $F=NP$ where F is the tachometer generator frequency output in cycles per second, N is the angular speed of the generator in revolutions per second, and P is the number of pairs of poles in the tachometer generator. The number of pole pairs in such a device is limited by practical considerations to a relatively low number and this low number is invariant. As a result of these limitations, for the measurement of very high speeds and for highest accuracy, other types of tachometers are used such as an electronic tachometric system which involves conversion of rotational speed into electrical impulses. In such devices, a toothed gear may be mounted on a rotating shaft and a transducer, either photoelectric or magnetic, counts the teeth as they pass by, the impulses being fed into a high speed electronic counter combined with some form of accurate time base to provide an instrument that will count and ordinarily display the number of counts received per unit time. These instruments ordinarily are expensive, subject to operational and maintenance problems typical of electronic instrumentation, and where a fixed input speed exists, the pulse output per revolution can only be altered by changing the number of teeth on the wheel or in some photoelectric types by changing the number of marks on a rotating surface. Furthermore, the number of such teeth or marks is ordinarily limited to a relatively low number by space considerations.

The most important object of the present invention is to provide a variable pole tachometer generator which can be used to establish, maintain and indicate a set speed of rotation.

Another important object of the invention is the provision of a tachometer generator in which the number of poles is relatively large and may be changed as desired to correspond, for example, to a different set speed.

A further object of the present invention is to provide a tachometer generator characterized by its simplicity, low cost, ease of maintenance, reliability, and by the use of components which are free from the effects of drift, aging or changes in ambient conditions.

With these and other objects in view, the variable pole tachometer generator disclosed herein comprises generally a wheel coupled to a rotary device for rotation therewith, a signal-sensing surface or memory means on the wheel and a means radially spaced from the surface for impressing thereon a high frequency reference signal and for picking off a signal with a frequency proportional to actual speed.

Other objectives and advantages will become apparent in the following specification wherein reference is made to the accompanying drawings.

In the drawings:
FIGURE 1 is a schematic representation of the regulation system into which the tachometer of the present invention has been incorporated for purposes of illustration;
FIG. 2 is a side view of the tachometer generator shown schematically in FIG. 1;
FIG. 3 is a diametrical cross section through the tachometer of FIG. 2;
FIG. 4 shows the use of two opposed pickup heads;
FIG. 5 is a side view of an alternate embodiment of the tachometer wheel;
FIG. 6 is a more detailed schematic representation of the circuitry shown in FIG. 1; and
FIG. 7 is a circuit diagram of the discriminator shown schematically in FIG. 6.

The speed regulation system shown schematically in FIG. 1 includes, as components thereof, a regulated rotary device 10 having a shaft 12, a signal-generating tachometer 14, amplifier 16, switch 18, a first reference frequency source 20, frequency comparison circuitry 22, a second reference frequency source 24, speed indicator 26, speed correction means 28, and a load 30.

As shown in FIG. 1, tachometer 14 is mounted on shaft 12 of motor 10 for rotation therewith and has located adjacent its periphery a recording-reproducing magnetic head 32 which is connected through amplifier 16 to switch 18. When switch 18 is in contact with terminal 34, any desired sinusoidal or other reference frequency within the limitations of the recording and pickup technique may be impressed and recorded upon a magnetically receptive strip 36 (FIGS. 2 and 3) on the periphery of tachometer wheel 14 at a time when shaft 12 is rotating at a desired set speed. Thus, the effective number of poles on the periphery of wheel 14 is a function of the reference frequency and shaft speed inputs. After the desired high frequency reference signal is impressed on strip 36, switch 18 is thrown to terminal 38 and a signal frequency is picked off and read out to circuitry 22 which signal is proportional to the actual speed of shaft 12. Accordingly, wheel 14 in combination with head 32 is an alternating current tachometer generator having an effective number of poles determined by the frequency of the impressed signal and the shaft speed of the regulated device, i.e., having an output at the frequency of source 20 when motor 10 is operating at set speed. If, for example, a 5000 cycle per second signal is impressed on wheel 14 while it is turning at 600 revolutions per minute, 500 effective pole pairs have been achieved, i.e., at a shaft speed of 600 r.p.m., the output of head 32 will also be at 5000 cycles per second. Circuit 22 has components for combining the speed generated signal frequency from the tachometer with that from frequency source 24 to produce an actual differential signal frequency which is then compared with a preselected differential frequency, as explained more fully in connection with FIGS. 6, 7 and in the copending application of Landis Serial No. 821,397, filed on even date herewith. Where the impressed signal is at 5000 cycles, that from source 24 could be at 5200 cycles, leaving a differential of 200 cycles. With the motor 10 operating at set speed, the actual and preselected differentials are the same. Upon the occurrence of a variation from set speed, an error signal is fed from circuit 22 to speed correction means 28 which functions to apply the error signal to motor 10 as a correction.

As shown in FIG. 6, the signal from tachometer 14 is forwarded to circuitry 22 which includes a mixing component 61 in which the transmitted signal is combined with that from the second reference source 24. The resulting signal is demodulated and filtered in a detector 62 and passed through a blocking capacitor 63. After amplification, this generated differential frequency is impressed on a discriminator 64 and simultaneously sent to indicator 26. Any output of discriminator 64 represents a deviation from a predetermined differential frequency and is transmitted through amplifier A-2 to a single pole double throw polarized relay 65 having normally open switch contacts. The armature of relay 65 moves away from the neutral position in a direction dependent on the polarity of the signal from A-2. If the signal strength is sufficient, the corresponding switch contacts of relays 65, 66 are closed, thereby energizing pilot motor 67 from A.C. source 68. Pilot motor 67 functions to vary the position of adjustable bushes (not shown) and thereby the speed of motor 10.

The demodulated signal from detector 62 and capacitor 63 is transmitted to discriminator circuit 64 via the amplifier A-1 in FIG. 6. When the circuit 64 shown in FIG. 7 is in resonance, the voltage drops across capacitor 71 and across inductor 72 are equal. Diodes 73, 74 rectify the voltages across capacitor 71 and inductor 72, respectively, with the polarities as shown in the figure. Resistors 75, 76 are provided for loading purposes. As long as the signal from coupling transformer 77 has a frequency equal to the series resonance frequency of capacitor 71 and inductor 72, i.e., as long as the beat frequency equals the predetermined differential frequency, the voltages across resistors 78, 79 will be equal and there is no output or error signal. However, if the generated differential frequency varies from the predetermined differential frequency, then the voltage drop across capacitor 71 will not equal the voltage drop across inductor 72 and a voltage will be impressed on amplifier A-2, thus producing current flow in the conductors which are connected to polarized relay 65, the direction of which is dependent on whether the generated differential frequency is above or below the resonance frequency.

In FIGS. 2 and 3, it is seen that wheel 14 has a hub 40 provided with a bore 42 and a rim 44 to which strip 36 is attached in any suitable manner. Strip 36 may be coated on the periphery of the wheel 14 or, alternatively, may be attached in the manner shown in FIG. 5 wherein it has been wrapped about wheel 14', with its ends extending through a slot 46. These ends are clamped by a fastener 48 in a clamp 50 which is resiliently attached to hub 40' by a coil spring 52.

In FIG. 4, two pickup heads 32 are shown. These heads are diametrically opposed but spaced axially a short distance apart so as to both record and read in two separate tracks. In the event that the periphery of the wheel 14 is not perfectly concentric, this arrangement reduces variations in signal level since both heads are connected to amplifier 16 through the same leads.

When a reference signal is being impressed on wheel 14, it is not essential that an integral number of cycles be recorded during a single revolution. The resulting phase discontinuity, which occurs when switch 18 is moved to contact 38, is usually not important. If more exact results are required, they may be achieved by refinements in the circuitry of source 20. No erasing means have been shown, it having been found that recording with a sufficiently strong signal eliminates the need therefor. In this respect, the head 32 is mounted in close proximity to strip 36, leaving an air gap of approximately 0.004 inch.

When a reference signal is being impressed on wheel 14, it is not essential that the signal be at a constant frequency. By varying the impressed frequency in a predetermined program, and using this in a speed regulation system the output of the system can be varied in the desired cyclic manner. Such an output has utility, e.g., in driving the traverse mechanism in a yarn windup where ribbons would otherwise develop or in controlling the drive of a spinning pump to produce thick and thin yarn.

It is apparent therefore that a variable pole tachometer generator has been provided which is useful in both the regulation and/or indication of the speed of a rotary device, e.g., either speed indicator 26 or speed correction means 28 can be removed from the system shown schematically in FIG. 1. The disclosed tachometer is useful over a wide range of motor set speeds in view of the fact that the number of effective poles may be varied as desired. Since the number of poles is relatively large, the system is correspondingly more accurate than those previously provided.

It is apparent that many changes and modifications may be made in the disclosed speed regulation system without departing from the spirit of the invention which is therefore intended to be limited only by the scope of the appended claims.

I claim:

1. In a system for regulating the speed of a rotary device: a wheel coupled to said device for rotation therewith; a strip of magnetically receptive material attached to the periphery of said wheel; a magnetic head situated in close proximity to said strip; first and second reference signal sources; a circuit coupled to the device for applying a speed correction thereto; and switch means for selectively coupling the head to said first source for impressing the signal therefrom on said strip and to said circuit for analysis of the impressed signal, said switch means thereby facilitating recording of said first reference signal on said strip each time the set speed of said device is changed, said circuit including components for mixing the signals from said head and said second source to produce a beat frequency and for resonating said beat frequency against a selected low frequency.

2. The system of claim 1 wherein two diametrically opposed axially spaced heads are provided, each electrically connected to said switch means.

References Cited in the file of this patent
UNITED STATES PATENTS

| | | |
|---|---|---|
| 2,017,894 | Cady | Oct. 22, 1935 |
| 2,408,451 | Sorensen | Oct. 1, 1946 |
| 2,551,306 | Wisman | May 1, 1951 |
| 2,602,837 | Foster et al. | July 8, 1952 |
| 2,652,554 | Williams et al. | Sept. 15, 1953 |
| 2,786,978 | Warner | Mar. 26, 1957 |
| 2,821,785 | Lekas | Feb. 4, 1958 |
| 2,877,415 | Rolle | Mar. 10, 1959 |
| 2,878,427 | Best | Mar. 17, 1959 |
| 2,993,161 | Steele | July 18, 1961 |

FOREIGN PATENTS

| | | |
|---|---|---|
| 750,787 | Great Britain | June 20, 1956 |